US012776947B2

(12) United States Patent
Sivasiva Ganesan

(10) Patent No.: US 12,776,947 B2
(45) Date of Patent: Oct. 27, 2026

(54) 5GS INTERWORKING WITH TIME SENSITIVE NETWORK TRANSPORT NETWORK

(71) Applicant: Nokia Technologies Oy, Espoo (FI)

(72) Inventor: Rakash Sivasiva Ganesan, Aschaffenburg (DE)

(73) Assignee: Nokia Technologies Oy, Espoo (FI)

( * ) Notice: Subject to any disclaimer, the term of this patent is extended or adjusted under 35 U.S.C. 154(b) by 867 days.

(21) Appl. No.: 18/191,814

(22) Filed: Mar. 28, 2023

(65) Prior Publication Data

US 2023/0318913 A1 Oct. 5, 2023

Related U.S. Application Data

(60) Provisional application No. 63/325,051, filed on Mar. 29, 2022.

(51) Int. Cl.
*H04L 41/0803* (2022.01)
*H04L 65/40* (2022.01)
*H04W 84/04* (2009.01)

(52) U.S. Cl.
CPC .......... *H04L 41/0803* (2013.01); *H04L 65/40* (2013.01); *H04W 84/042* (2013.01)

(58) Field of Classification Search
CPC ............... H04L 41/0803; H04L 65/40; H04W 28/0268; H04W 76/22; H04W 84/042
See application file for complete search history.

(56) References Cited

FOREIGN PATENT DOCUMENTS

WO 2020/239231 A1 12/2020

OTHER PUBLICATIONS

3GPP TS 23.501 V16.12.0; 3rd Generation Partnership Project; Technical Specification Group Services and System Aspects; System architecture for the 5G System (5GS); Stage 2 (Year: 2022).*
"3rd Generation Partnership Project; Technical Specification Group Services and System Aspects; System architecture for the 5G System (5GS); Stage 2 (Release 17)", 3GPP TS 23.501, V17.3.0, Dec. 2021, pp. 1-559.

(Continued)

*Primary Examiner* — Asad M Nawaz
*Assistant Examiner* — Natali N Pascual Peguero
(74) *Attorney, Agent, or Firm* — Barta Jones, PLLC

(57) ABSTRACT

A method may include configuring a first network element and a user plane function to expose port information of a first network element and a user plane function to a backhaul network. Associated identifiers of the first network element and the user plane function may be received from a second network element. Second stream requirements may be determined in 5GS for the streams transmitted through 5GS. First stream requirements may be derived for a stream to be transmitted between a talker and a listener, and talker and listener identifiers which are the identifiers of the first network element or the user plane function for the backhaul centralized network configurator. Configurations are received of the first network element and the user plane function. Additionally, a protocol data unit session modification procedure may be triggered for the stream.

10 Claims, 9 Drawing Sheets

(56) References Cited

OTHER PUBLICATIONS

"IEEE Standard for Local and Metropolitan Area Networks—Bridges and Bridged Networks, Amendment 31: Stream Reservation Protocol (SRP) Enhancements and Performance Improvements", IEEE Computer Society, IEEE Std 802.1Qcc, 2018, pp. 1-208.

"3rd Generation Partnership Project; Technical Specification Group Services and System Aspects; Procedures for the 5G System (5GS); Stage 2 (Release 18)", 3GPP TS 23.502, V18.0.0, Dec. 2022, pp. 1-773.

Partial European Search Report received for corresponding European Patent Application No. 23164944.3, dated Aug. 29, 2023, 12 pages.

"Introduction of architecture for AF requested support of Time Sensitive Communication and Time Synchronization", SA WG2 Meeting #145E (e-meeting), S2-2105082, vivo, May 17-28, 2021, 44 pages.

"Rapporteur CR for editorial fixes", 3GPP TSG-SA2 Meeting #147E, S2-2107304, Nokia, 2021, pp. 1-39.

"3rd Generation Partnership Project; Technical Specification Group Services and System Aspects; Study on enhanced support of Industrial Internet of Things (IIoT) in the 5G System (5GS) (Release 17)", 3GPP TR 23.700-20, V1.1.0, Oct. 2020, pp. 1-88.

Extended European Search Report received for corresponding European Patent Application No. 23164944.3, dated Nov. 29, 2023, 12 pages.

"IEC/IEEE 60802 Time-Sensitive Networking Profile for Industrial Automation", IEC/IEEE 60802 Joint Project, 60802 © IEC/IEEE:2024 Draft 2.4, 2024, pp. 1-194.

* cited by examiner

5GS INTERWORKING WITH TIME SENSITIVE NETWORK TRANSPORT NETWORK

CROSS-REFERENCE TO RELATED APPLICATIONS

This patent application claims the benefit of priority of U.S. Provisional Patent Application No. 63/325,051, filed Mar. 29, 2022, which is hereby incorporated by reference as if reproduced in its entirety.

FIELD

Some example embodiments may generally relate to mobile or wireless telecommunication systems, such as Long Term Evolution (LTE) or fifth generation (5G) new radio (NR) access technology, or 5G beyond, or other communications systems. For example, certain example embodiments may relate to apparatuses, systems, and/or methods for 5G system (5GS) interworking with time sensitive network (TSN) transport network.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G network technology is mostly based on new radio (NR) technology, but the 5G (or NG) network can also build on E-UTRAN radio. It is estimated that NR will provide bitrates on the order of 10-20 Gbit/s or higher and will support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the Internet of Things (IoT).

SUMMARY

Some example embodiments may be directed to a method. The method may include configuring a first network element and a user plane function to expose port information of a first network element and a user plane function to a backhaul network. The method may also include receiving associated identifiers of the first network element and the user plane function from a second network element. The method may further include determining second stream requirements in 5GS for the streams transmitted through 5GS. In addition, the method may include deriving first stream requirements for a stream to be transmitted between a talker and a listener based on the second stream requirements and talker and listener identifiers which are the associated identifiers of the first network element or the user plane function for the backhaul network. In addition, the method may include receiving configurations of the first network element and the user plane function to the first network element and the user plane function based on the first stream requirements. Further, the method may include triggering a protocol data unit session modification procedure for the stream based on the second stream requirements and the configurations of the first network element and the user plane function.

Other example embodiments may be directed to an apparatus. The apparatus may include at least one processor and at least one memory including computer program code. The at least one memory and computer program code may also be configured to, with the at least one processor, cause the apparatus at least to a first network element and a user plane function to expose port information of a first network element and a user plane function to a backhaul network. The apparatus may also be caused to receive associated identifiers of the first network element and the user plane function from a second network element. The apparatus may further be caused to determining second stream requirements in 5GS for the streams transmitted through 5GS. In addition, the apparatus may be caused to derive first stream requirements for a stream to be transmitted between a talker and a listener based on the second stream requirements and talker and listener identifiers which are the associated identifiers of the first network element or the user plane function for the backhaul network. In addition, the apparatus may be caused to receiving configurations of the first network element and the user plane function to the first network element and the user plane function based on the first stream requirements. Further, the apparatus may be caused to trigger a protocol data unit session modification procedure for the stream based on the second stream requirements and the configurations of the first network element and the user plane function.

Other example embodiments may be directed to an apparatus. The apparatus may include means for configuring a first network element and a user plane function to expose port information of a first network element and a user plane function to a backhaul network. The apparatus may also include means for receiving associated identifiers of the first network element and the user plane function from a second network element. The apparatus may also include means for determining second stream requirements in 5GS for the streams transmitted through 5GS. The apparatus may further include means for deriving first stream requirements for a stream to be transmitted between a talker and a listener based on the second stream requirements and talker and listener identifiers which are the associated identifiers of the first network element or the user plane function for the backhaul network. In addition, the apparatus may include means for receiving configurations of the first network element and the user plane function to the first network element and the user plane function based on the first stream requirements. Further, the apparatus may include means for triggering a protocol data unit session modification procedure for the stream based on the second stream requirements and the configurations of the first network element and the user plane function.

In accordance with other example embodiments, a non-transitory computer readable medium may be encoded with instructions that may, when executed in hardware, perform a method. The method may include configuring a first network element and a user plane function to expose port information of a first network element and a user plane function to a backhaul network. The method may also include receiving associated identifiers of the first network element and the user plane function from a second network element. The method may further include determining second stream requirements in 5GS for the streams transmitted through 5GS. In addition, the method may include deriving first stream requirements for a stream to be transmitted between a talker and a listener based on the second stream requirements and talker and listener identifiers which are the associated identifiers of the first network element or the user plane function for the backhaul network. In addition, the method may include receiving configurations of the first network element and the user plane function to the first network element and the user plane function based on the first stream requirements. Further, the method may include triggering a protocol data unit session modification procedure for the stream based on the second stream requirements and the configurations of the first network element and the user plane function.

Other example embodiments may be directed to a computer program product that performs a method. The method may include configuring a first network element and a user plane function to expose port information of a first network element and a user plane function to a backhaul network. The method may also include receiving associated identifiers of the first network element and the user plane function from a second network element. The method may further include determining second stream requirements in 5GS for the streams transmitted through 5GS. In addition, the method may include deriving first stream requirements for a stream to be transmitted between a talker and a listener based on the second stream requirements and talker and listener identifiers which are the associated identifiers of the first network element or the user plane function for the backhaul network. In addition, the method may include receiving configurations of the first network element and the user plane function to the first network element and the user plane function based on the first stream requirements. Further, the method may include triggering a protocol data unit session modification procedure for the stream based on the second stream requirements and the configurations of the first network element and the user plane function.

Other example embodiments may be directed to an apparatus that may include circuitry configured to configure a first network element and a user plane function to expose port information of a first network element and a user plane function to a backhaul network. The apparatus may also include circuitry configured to receive associated identifiers of the first network element and the user plane function from a second network element. The apparatus may also include circuitry configured to determine second stream requirements in 5GS for the streams transmitted through 5GS. The apparatus may further include circuitry configured to deriving first stream requirements for a stream to be transmitted between a talker and a listener based on the second stream requirements and talker and listener identifiers which are the associated identifiers of the first network element or the user plane function for the backhaul network. In addition, the apparatus may include circuitry configured to receiving configurations of the first network element and the user plane function to the first network element and the user plane function based on the first stream requirements. Further, the apparatus may include circuitry configured to trigger a protocol data unit session modification procedure for the stream based on the second stream requirements and the configurations of the first network element and the user plane function.

Certain example embodiments may be directed to a method. The method may receiving scheduling information and traffic information from an overlay network. The method may also include mapping the scheduling information and the traffic information to first stream requirements. The method may further include providing the first stream requirements along with bridged endstation identifiers to a backhaul network.

Other example embodiments may be directed to an apparatus. The apparatus may include at least one processor and at least one memory including computer program code. The at least one memory and computer program code may be configured to, with the at least one processor, cause the apparatus at least to receive scheduling information and traffic information from an overlay network. The apparatus may also be caused to map the scheduling information and the traffic information to first stream requirements. The apparatus may further be caused to provide the first stream requirements along with bridged endstation identifiers to a backhaul network.

Other example embodiments may be directed to an apparatus. The apparatus may include means for receiving scheduling information and traffic information from an overlay network. The apparatus may also include means for mapping the scheduling information and the traffic information to first stream requirements. The apparatus may further include means for providing the first stream requirements along with bridged endstation identifiers to a backhaul network.

In accordance with other example embodiments, a non-transitory computer readable medium may be encoded with instructions that may, when executed in hardware, perform a method. The method may include receiving scheduling information and traffic information from an overlay network. The method may also include mapping the scheduling information and the traffic information to first stream requirements. The method may further include providing the first stream requirements along with bridged endstation identifiers to a backhaul network.

Other example embodiments may be directed to a computer program product that performs a method. The method may include receiving scheduling information and traffic information from an overlay network. The method may also include mapping the scheduling information and the traffic information to first stream requirements. The method may further include providing the first stream requirements along with bridged endstation identifiers to a backhaul network.

Other example embodiments may be directed to an apparatus that may include circuitry configured to receive scheduling information and traffic information from an overlay network. The apparatus may also include circuitry configured to map the scheduling information and the traffic information to first stream requirements. The apparatus may further include circuitry configured to provide the first stream requirements along with bridged endstation identifiers to a backhaul network.

Further example embodiments may be directed to a method. The method may include providing port information of a first network element or a user plane function to a backhaul network. The method may also include receiving configuration information of the first network element or the user plane function during a session modification procedure. The method may further include transmitting data based on the configuration information.

Other example embodiments may be directed to an apparatus. The apparatus may include at least one processor and at least one memory including computer program code. The at least one memory and computer program code may be configured to, with the at least one processor, cause the apparatus at least to provide port information of a first network element or a user plane function to a backhaul network. The apparatus may also be caused to receive configuration information of the first network element or the user plane function during a session modification procedure. The apparatus may further be caused to transmit data based on the configuration information.

Other example embodiments may be directed to an apparatus. The apparatus may include means for providing port information of a first network element or a user plane function to a backhaul network. The apparatus may also include means for receiving configuration information of the first network element or the user plane function during a session modification procedure. The apparatus may further include means for transmitting data based on the configuration information.

In accordance with other example embodiments, a non-transitory computer readable medium may be encoded with instructions that may, when executed in hardware, perform a method. The method may include providing port information of a first network element or a user plane function to a backhaul network. The method may also include receiving configuration information of the first network element or the user plane function during a session modification procedure. The method may further include transmitting data based on the configuration information.

Other example embodiments may be directed to a computer program product that performs a method. The method may providing port information of a first network element or a user plane function to a backhaul network. The method may also include receiving configuration information of the first network element or the user plane function during a session modification procedure. The method may further include transmitting data based on the configuration information.

Other example embodiments may be directed to an apparatus that may include circuitry configured to provide port information of a first network element or a user plane function to a backhaul network. The apparatus may also include circuitry configured to receive configuration information of the first network element or the user plane function during a session modification procedure. The apparatus may further include circuitry configured to transmit data based on the configuration information.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for 5GS interworking with TSN transport network.

The features, structures, or characteristics of example embodiments described throughout this specification may be combined in any suitable manner in one or more example embodiments. For example, the usage of the phrases “certain embodiments,” “an example embodiment,” “some embodiments,” or other similar language, throughout this specification refers to the fact that a particular feature, structure, or characteristic described in connection with an embodiment may be included in at least one embodiment. Thus, appearances of the phrases “in certain embodiments,” “an example embodiment,” “in some embodiments,” “in other embodiments,” or other similar language, throughout this specification do not necessarily refer to the same group of embodiments, and the described features, structures, or characteristics may be combined in any suitable manner in one or more example embodiments. Further, the terms “cell”, “node”, “gNB”, or other similar language throughout this specification may be used interchangeably.

Figure 1:
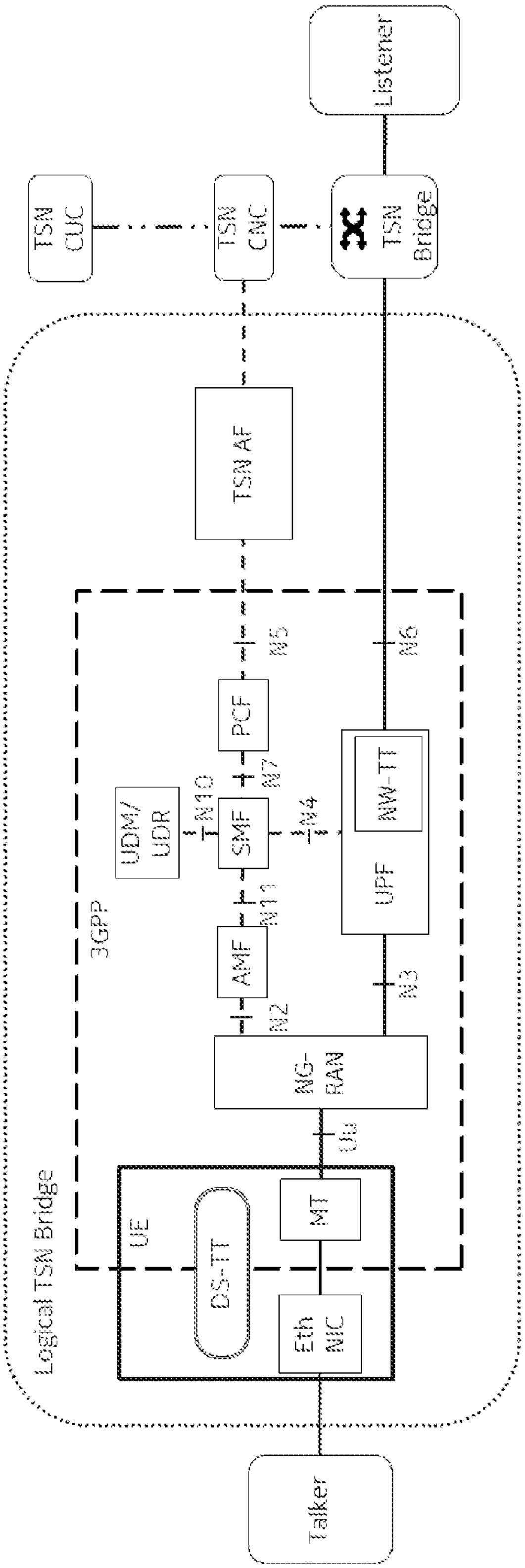
FIG. 1 illustrates an example 5GS as a bridge in a time sensitive network (TSN).

FIG. 1 illustrates an example 5GS as a bridge in the TSN network. Specifically, FIG. 1 illustrates the example 5GS as a logical TSN bridge (dotted rounded box). $3^{rd}$ Generation Partnership Project (3GPP) describes integration of a 5GS in an industrial TSN. The 5GS may include user equipment (UEs), a radio access network (RAN), and a user plane function (UPF). Further, the 5GS may be modeled as a bridge in the TSN network. For instance, two entities, namely, the network side TSN translator (NW-T) and the device side TSN translator (DS-TT) may encapsulate the 5GS as a bridge. The NW-TT and DS-TT may interact with the TSN network to exchange parameters such as link-layer discovery protocol (LLDP) parameters and comply with the Institute of Electrical and Electronics Engineers (IEEE) protocols (user plane) defined for TSN data transmission. Additionally, the TSN application function (AF) may be introduced as the function to enable control plane functionalities between 5GS and the TSN network centralized network configurator (CNC). The TSN AF may be responsible for exposing 5GS bridge parameters such as bridge delay to the CNC. Furthermore, the TSN AF may convert the scheduling parameters provided by the CNC to configure the quality of service (QoS) flows within the 5GS.

According to 3GPP, the 5GS may be enhanced to support time sensitive communication (TSC), which is not necessarily TSN based communication. In some instances, a new entity called time sensitive communication time synchronization function (TSCTSF) may be introduced to map the requirements and parameters provided by any application to the 5GS specific QoS parameters and service requirements.

Figure 2:
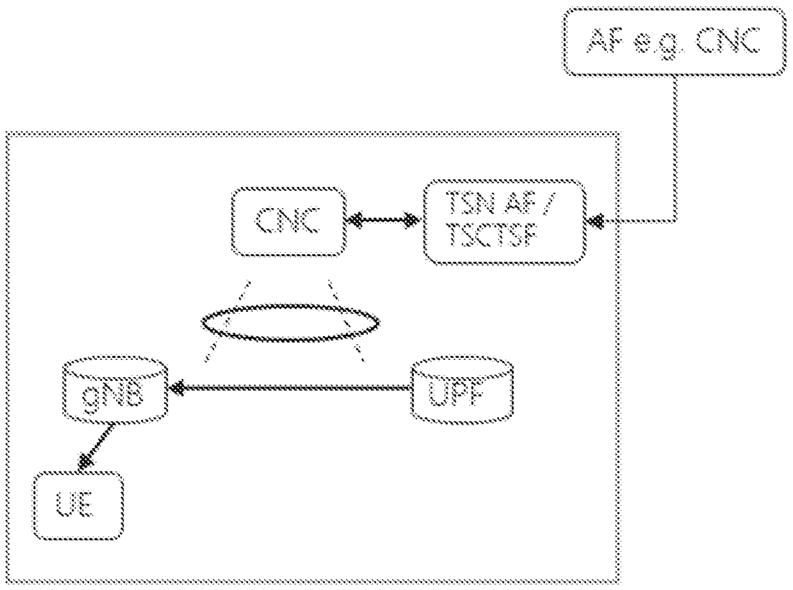
FIG. 2 illustrates an example TSN transport network between a gNB and a user plane function (UPF).

FIG. 2 illustrates an example TSN transport network between the gNB and the UPF. In 3GPP, the backhaul network between the gNB and the UPF may be assumed to be a legacy IP/Ethernet transport network without any time sensitive capability. Additionally, it has been proposed to consider the TSN network deployed in the backhaul network. The network external to the 5GS (i.e., beyond the UE and the UPF) may be called an overlay network, and the overlay network may be a TSN network or a TSC network. The communicating entity between the 5GS and the overlay network may be the TSN AF or the TSCTSF for the case of TSN or TSC overlay network, respectively.

The backhaul TSN network may be a centralized configuration model with the backhaul CNC coordinating the traffic schedule. The interworking between the 5GS, the TSN backhaul network, and the overlay network may be necessary to provide an efficient end-to-end (E2E) connection (i.e., to reduce E2E delay and enhance deterministic delivery of packets). As such, certain example embodiments may provide a signaling mechanism to enable this interworking.

Figure 3:
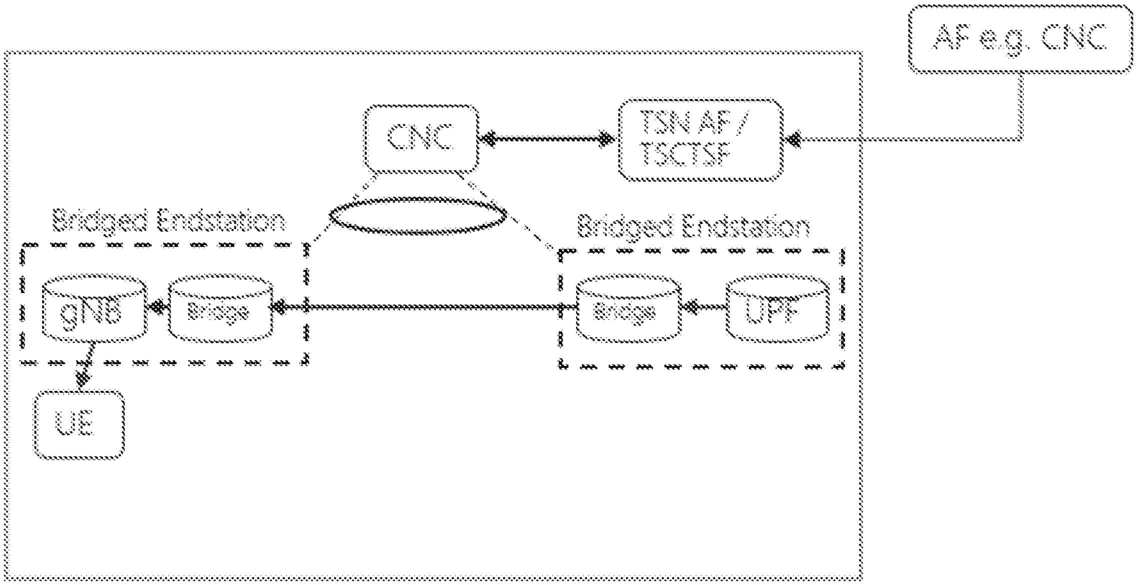
FIG. 3 illustrates an example UPF and gNB as TSN unaware end station, and part of a bridged end station.

FIG. 3 illustrates an example UPF and gNB as TSN unaware end station, and part of a bridge end station. Certain example embodiments may map stream requirements and scheduling information from the overlay network to that of the backhaul network. In some example embodiments, this may be accomplished with end devices in the backhaul TSN network that are TSN aware devices (e.g., gNB and UPF). In other example embodiments, this may be accomplished with end devices that are TSN unaware devices.

In a scenario of the end devices in the backhaul TSN network that are TSN aware devices, a network function (e.g., TSN AF, TSCTSF, or session management function (SMF)) may collect the gNB and the UPF IDs. This information may be provided by gNB and UPF as part of the PDU session establishment procedure. Alternatively, this information can be pre-configured at the network function. In addition, the gNB and the UPF may be pre-configured or configured by the network function to expose the port information in a distributed way through the LLDP protocol. The port information includes at least one of the gNB and the UPF IDs, the port number and the TSN capability of the port(s). In certain example embodiments, the network function may map traffic information (e.g., burst size, periodicity, etc.), and the scheduling information (e.g., burst arrival times, Qbv schedule, per stream filtering and policing (PSFP) information, etc.) to the stream requirements in the backhaul network. Thus, in certain example embodiments, the network function aggregate multiple streams in the overlay network to one or more streams (requirements) in the backhaul network. In some example embodiments, the aggregation may be based on the priority class of each stream.

In other example embodiments, the network function may store binding information between the UE/protocol data unit (PDU) session relevant for the stream and the RAN that serves the UE. Alternatively, the network function may retrieve the binding information from another network function such as, for example, the application and mobility management function (AMF). According to certain example embodiments, based on the binding information, the network function may derive the talker and listener ID in the TSN backhaul network. According to some example embodiments, for uplink (UL), the talker may be the gNB, and the listener may be the UPF. However, for downlink (DL), the talker may be the UPF and the listener may be the gNB.

According to certain example embodiments, the network function may provide the stream requirements, and talker and listener ID to the CNC in the backhaul network. Here, the network function may operate as the centralized user configuration (CUC) in the backhaul TSN network. In response, the CNC may provide the talker and listener configuration to the network function, and the network function may map the talker and listener configurations to the gNB and UPF configurations and forward them to the gNB and UPF. In certain example embodiments, the network function may use the 3GPP containers (i.e., bridge management information container (BMIC)/port management information container (PMIC) or the TSCTSF containers to provide the configuration information to the gNB and the UPF. For this purpose, these containers may be extended to include additional parameters such as, for example, TimeAwareOffset. In other example embodiments, the network function may simultaneously trigger a QoS update based on the stream requirements from the overlay network. That is, the configuration parameters may be provided as part of the PDU session modification procedure (i.e., simultaneously providing the configuration parameters to the gNB and UPF).

According to certain example embodiments, in a scenario of when the end devices are TSN unaware device, the bridged endstation may be used to reduce the standardization impact to the 5GS. In this case, talker and listener (i.e., UPF and gNB) may be the TSN unaware devices. Here, the network function (e.g., TSN AF, TSCTSF, or SMF) in 5GS may map the traffic information (e.g., burst size, periodicity, etc.), and the scheduling information (e.g., burst arrival times, Qbv schedule, PSFP information, etc.) to the stream requirements in the backhaul network. As such, the network function may aggregate multiple streams in the overlay network to one or more streams (requirements) in the backhaul network. The aggregation may be based on the priority class of each stream. In other example embodiments, the network function may store the binding information between the UE/PDU session relevant for the stream, and the RAN that serves the UE. Alternatively, the binding information may be retrieved from another network function (e.g., AMF). Furthermore, the network function may either be preconfigured with the bridge endstation ID associated with the gNB and the UPF, or it may be retrieved from the other network functions on a need basis. In some example embodiments, based on the binding information, the network function may derive the bridge endstation IDs in the TSN backhaul network. In another example embodiment, the associated bridged endstation IDs may be provided from the gNB and UPF to the SMF as part of the PDU session establishment procedure.

In certain example embodiments, when the end devices are TSN unaware devices, the network function may provide the stream requirements, and bridged end station IDs to the CNC in the backhaul network. Here, the network function may play the role of CUC in the backhaul TSN network. Alternatively, in other example embodiments, the network function may forward the stream requirements to the bridged endstation, which may then use its own CUC to provide the requirements to the CNC. In response, the CNC may provide the talker and listener configuration to the bridged endstation. Further, in certain example embodiments, the network function may trigger a QoS update based on the stream requirements from the overlay network. Additionally, in other example embodiments, the gNB/UPF may not have a need for any special configuration compared to 3GPP R-16 procedure. Instead, the UPF/gNB may forward the packet as soon as it is received based on the 3GPP R-16 forwarding mechanism. In certain example embodiments, the bridged endstation may take care of transmitting as per the CNC schedule.

According to certain example embodiments, the overlay network may be assumed to be the TSN network. However, similar procedures may also be applicable for the TSC overlay network. Additionally, in some example embodiments, the network function may be assumed to be the TSN AF in certain implementations. However, in other example embodiments, the network function may be other functions such as, for example, an SMF.

Figure 4:
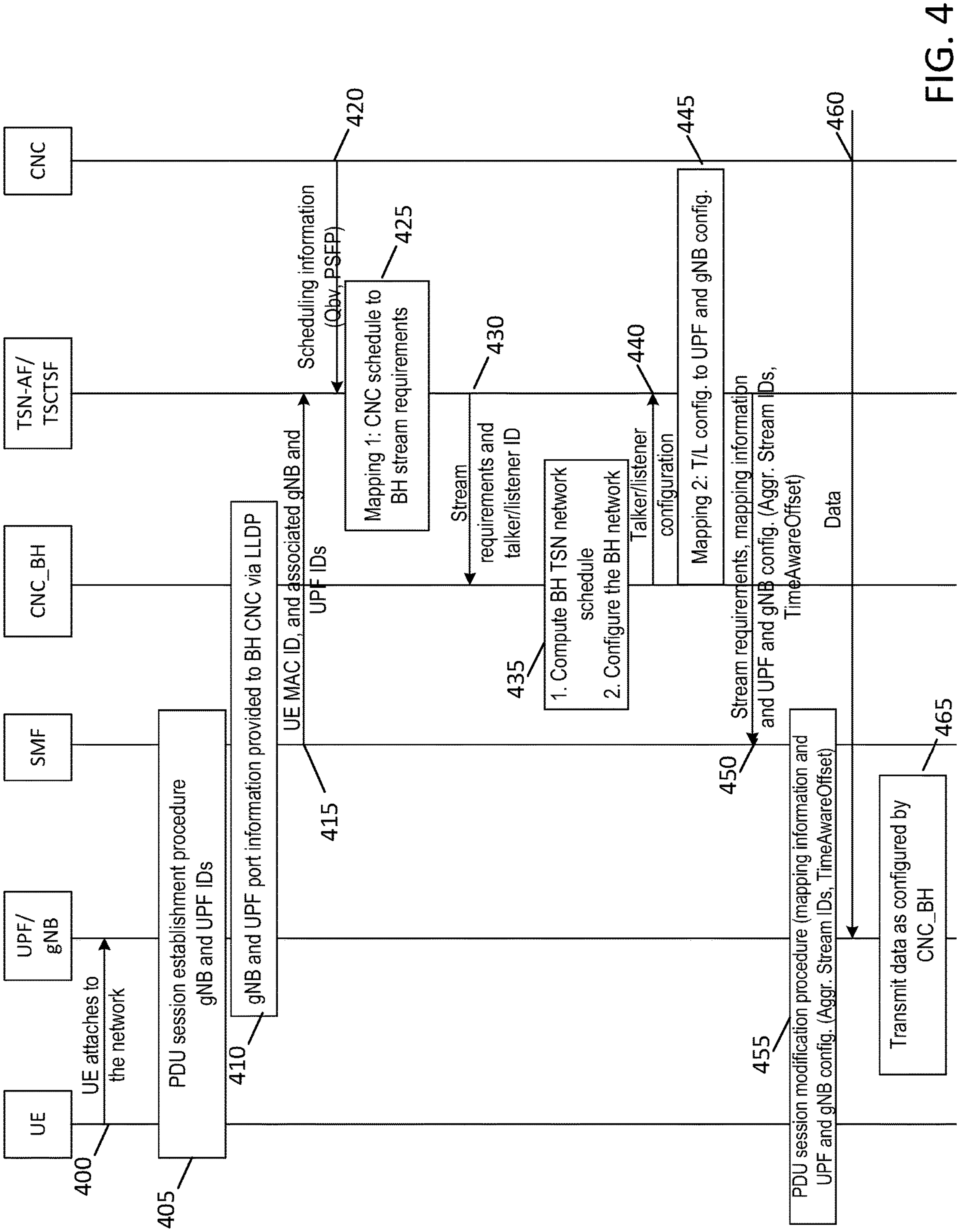
FIG. 4 illustrates an example signal flow of interworking of the overlay TSN network, the 5GS, and the TSN backhaul network, according to certain example embodiments.

FIG. 4 illustrates an example signal flow of interworking of the overlay TSN network, the 5GS, and the TSN backhaul network, according to certain example embodiments. In particular, the example signal flow of FIG. 4 may be based on a method where the end devices in the backhaul TSN network are TSN aware devices (e.g., gNB and UPF).

As illustrated in FIG. 4, at 400, the UE may attach to the network, and may, at 405, establish a PDU session. At 410, the 5GS may expose the relevant gNB and UPF ports (towards N3) to the CNC in the backhaul network (CNC_BH). According to certain example embodiments, the exposure may be performed by the gNB and UPF using the LLDP protocol as defined in the TSN. By performing this step, it may be possible for the CNC_BH to know the topology of the backhaul network. Furthermore, in another example embodiment, the gNB and UPF IDs may be either provided by the gNB and the UPF to the SMF during PDU session establishment procedure at 405, or pre-configured at the SMF.

At 415, the SMF may provide the UE medium access control (MAC) ID, and associated gNB and UPF IDs to the TSN AF. At 420, the CNC in the overlay network may provide the scheduling information (e.g., Qbv, PSFP) to the TSN AF, and at 425, the TSN AF may derive the stream requirements for the backhaul network (i.e., network between UPF and gNB). At 430, the TSN AF may forward the stream requirements and talker/listener ID to the CNC_BH. With the received information, the CNC_BH may, at 435, compute the schedule for the backhaul network, and configure the nodes in the backhaul network. At 440, the CNC_BH may provide the talker and listener configuration(s) to the TSN AF to configure the UPF and the gNB. At 445, the TSN AF may map the talker and listener configurations to the UPF and gNB configuration. According to some example embodiments, the mapping may include copying the parameters of the talker and listener configurations to a container along with the information needed to perform stream aggregation (i.e., mapping in operation 425). In certain example embodiments, the parameters may include a TimeAwareOffset, which defines when the gNB or the UPF should transmit the packet to the next hop node. Furthermore, the parameter set may include the IDs of the streams in the overlay network, the IDs to be used for the aggregated streams, and the mapping between overlay streams and the aggregated streams. The mapping could also use other traffic characteristics such as, for example, priority class of the traffic instead of the stream ID of the overlay network traffic. According to other example embodiments, the network function (e.g., SMF) may convert this mapping into sets of PDR/FAR rules (where PDR rules may use overlay network stream IDS) along with the stream IDs of the backhaul network.

At 450, the TSN AF may send the stream requirements and UPF and gNB configurations (e.g., mapping information of the overlay network traffic to the streams in the backhaul network, IDs used for aggregated streams, TimeAwareOffset, etc.) to the SMF for configuring the gNB and the UPF via a session modification procedure. At 455, based on the request from the TSN AF, the SMF may trigger the PDU session modification procedure during which the UPF and the gNB are configured with the new parameters described above. Furthermore, the 5GS network function may derive the packet detection rules (PDR) and forwarding action rules (FAR) based on the mapping information, and provide gNB and UPF the PDR/FAR rules along with the stream IDs to be used for aggregated backhaul streams and the TimeAwareOffset. At 460, when the packets may arrive at the gNB/UPF, packets of different streams may be aggregated as per the mapping in operation 425, and it may be transmitted as per the schedule provided by the CNC_BH. In case of downlink, at 465, the UPF may transmit data as configured by the CNC_BH to the gNB. Similarly, in case of uplink, at 465, the data is transmitted from the gNB to the UPF as configured by the CNC.

Figure 5:
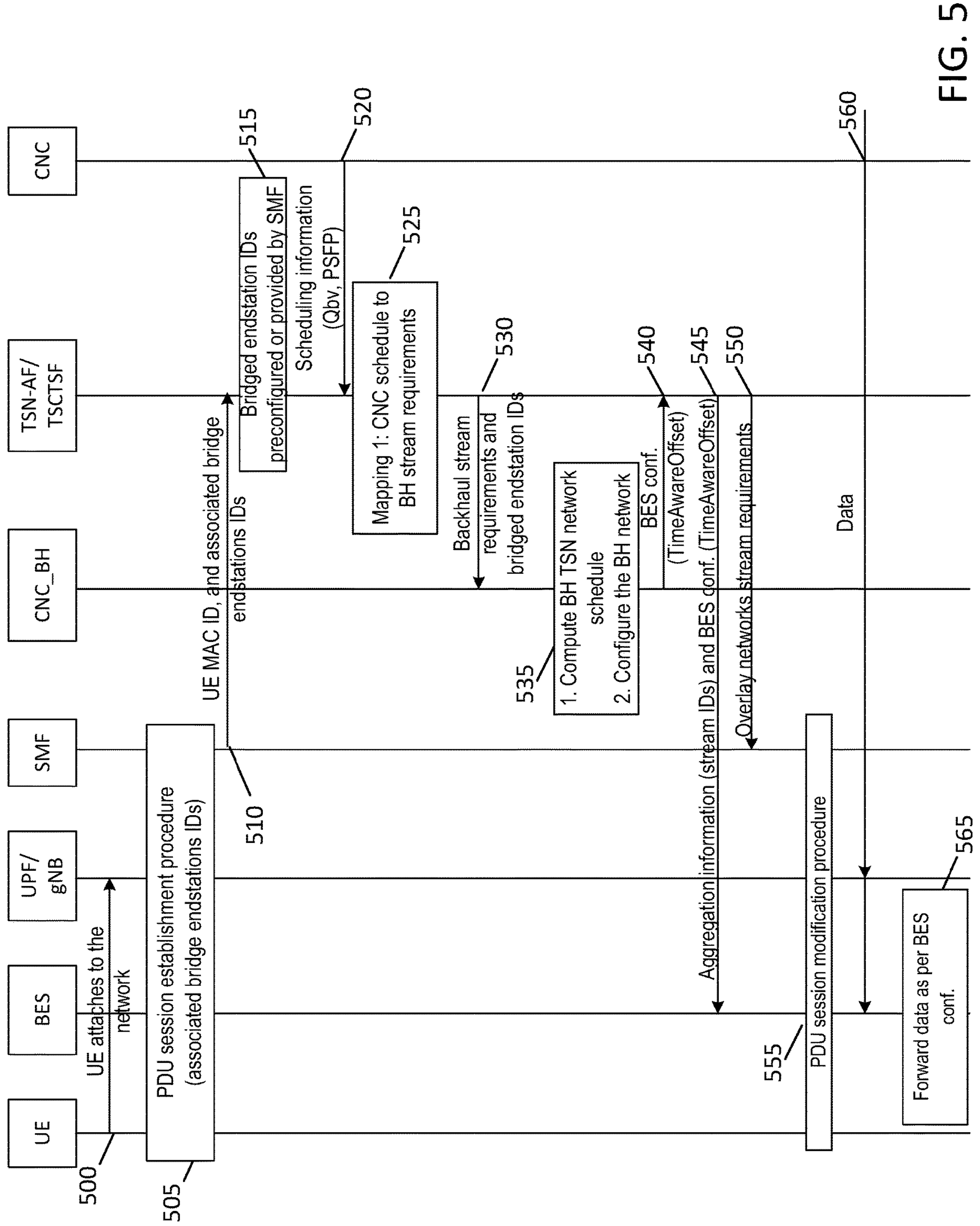
FIG. 5 illustrates another example signal flow of interworking of the overlay TSN network, the 5GS, and the TSN backhaul network, according to certain example embodiments.

FIG. 5 illustrates another example signal flow of interworking of the overlay TSN network, the 5GS, and the TSN backhaul network, according to certain example embodiments. In particular, the example signal flow of FIG. 5 may be based on a method where the end devices in the backhaul TSN network are TSN unaware devices (e.g., gNB and UPF).

In contrast to the example signal flow of FIG. 4, in the example signal flow of FIG. 5, the UPF/gNB is not impacted by certain steps for the interworking. At 500, after the UE attaches to the network, the UE establishes a PDU session at 505 during which the gNB/UPF provides their associated endstation IDs to the SMF as part of the PDU session establishment procedure. These IDs may also be pre-configured at the SMF. The SMF may, at 510, expose, along with the UE MAC ID, the associated bridged endstation IDs. Alternatively, at 515, the associated bridged endstation IDs may be pre-configured at the TSN AF. At 520, the CNC in the overlay network may provide the scheduling information (e.g., Qbv, PSFP) to the TSN AF, and at 525, the TSN AF may derive the stream requirements for the backhaul network. According to certain example embodiments, the stream requirements may be associated with a PDU session in the backhaul network. At 530, the TSN AF may provide the derived BH stream requirements and the bridged endstation IDs to the CNC_BH.

With the received information from the TSN AF, the CNC_BH may, at 535, compute the schedule for the backhaul network, and configure the nodes in the backhaul network. At 540, the CNC_BH may provide the BES configurations (e.g., TimeAwareOffset) to the TSN AF. In response, at 545, the TSN AF may forward the backhaul schedules to the bridged endstation (BES) instead of the UPF/gNB. The TSN AF may also append the aggregation information along with the BES configuration information. According to certain example embodiments, the aggregation information may include the stream IDs of the aggregated stream to be use in the backhaul network and how to map the traffic from the overlay network to the streams in the backhaul network.

At 550, the TSN AF may provide the stream requirements of the overlay network to the SMF, and the SMF may, at 555, trigger a PDU session modification procedure to establish appropriate QoS flows. At 560, the UPF may forward the packets upon arrival immediately to the next hop node based on the forwarding table information provided by the TSN AF. Further, at 565, the BES may take care of the time aware transmission in the backhaul network. In case of downlink, the data may be forwarded towards the gNB, and in case of uplink, the data may be forwarded towards UPF.

Figure 6:
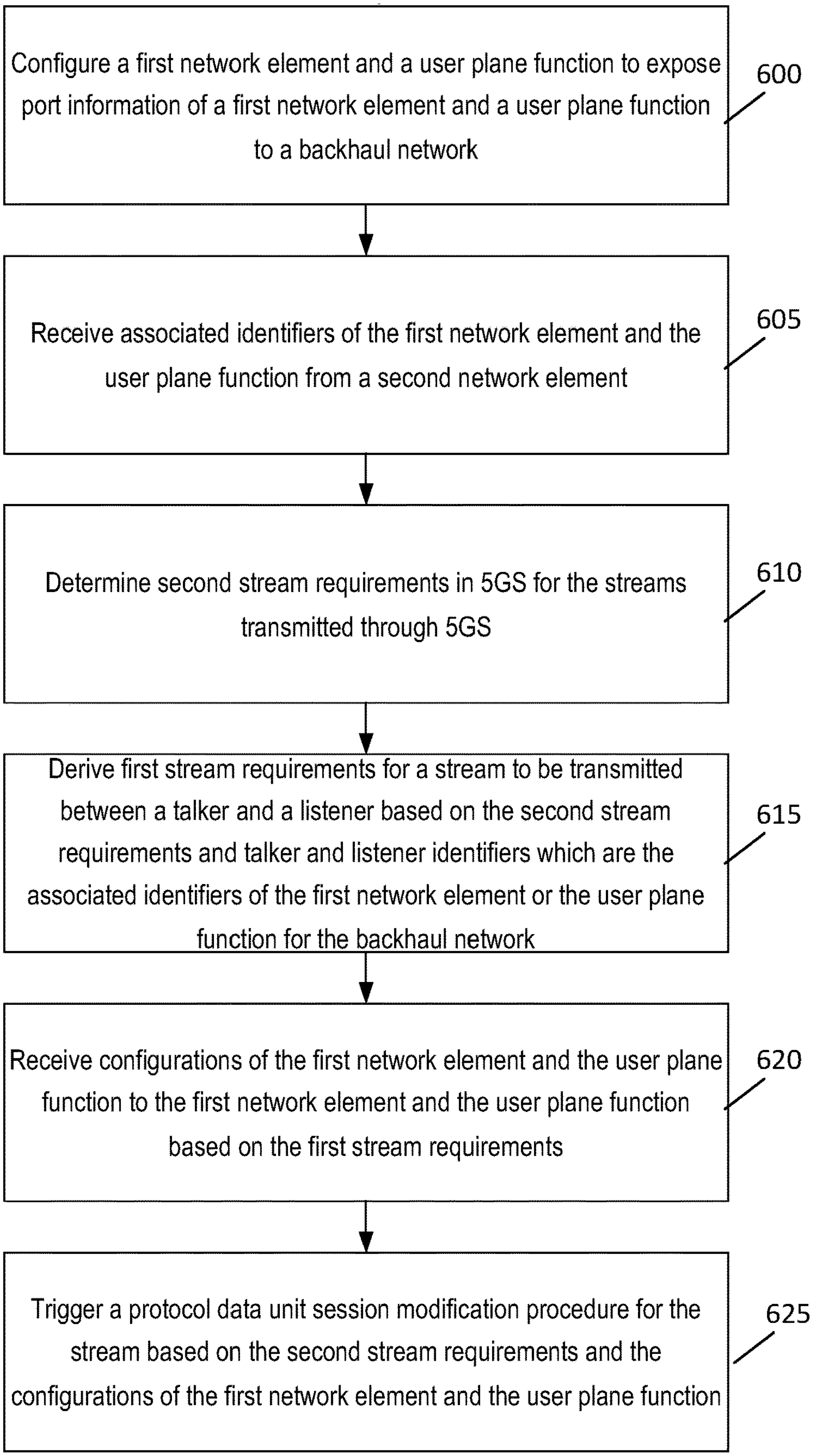
FIG. 6 illustrates an example flow diagram of a method, according to certain example embodiments.

FIG. 6 illustrates an example flow diagram of a method, according to certain example embodiments. In an example embodiment, the method of FIG. 6 may be performed by a network entity, or a group of multiple network elements in a 3GPP system, such as LTE or 5G-NR. For instance, in an example embodiment, the method of FIG. 6 may be performed by a network function such as, for example, a TSN AF, TSCTSF or SMF, or other device similar to one of apparatuses 10 or 20 illustrated in FIG. 9.

According to certain example embodiments, the method of FIG. 6 may include, at 600 configuring a first network element and a user plane function to expose port information of a first network element and a user plane function to a backhaul network. Alternatively, the exposing may be preconfigured at the first network element and the user plane function. At 605, the method may include receiving associated identifiers of the first network element and the user plane function from a second network element. At 610, the method may further include determining second stream requirements in 5GS for the streams transmitted through 5GS. At 615, the method may include deriving first stream requirements for a stream to be transmitted between a talker and a listener based on the second stream requirements and talker and listener identifiers which are the associated identifiers of the first network element or the user plane function for the backhaul network. In addition, at 620, the method may include receiving configurations of the first network element and the user plane function to the first network element and the user plane function based on the first stream requirements. Further, at 625, the method may include triggering a protocol data unit session modification procedure for the stream based on the second stream requirements and the configurations of the first network element and the user plane function.

According to certain example embodiments, the second network element may be the same as the first network element or the user plane function. According to other example embodiments, the method may also include creating binding information between the protocol data unit session associated with the user equipment relevant for the stream and a radio access network that serves the user equipment. According to some example embodiments, the method may further include deriving the talker and listener identifiers based on the binding information during session establishment. According to other example embodiments, the method may include forwarding the second stream requirements and the configurations of the first network element and the user plane function to the first network element and the user plane function via session modification signaling.

In certain example embodiments, the method may further include receiving scheduling information and traffic information from the backhaul network. In some example embodiments, the method may also include mapping the scheduling information and the traffic information to the first stream requirements. In other example embodiments, the method may further include mapping the talker and listener configurations to the configurations of the first network element and the user plane function based on the binding information.

According to certain example embodiments, mapping the talker and listener configurations may include copying parameters to a container along with information to perform stream aggregation. According to some example embodiments, the parameters may include a TimeAwareOffset parameter which defines when the first network element or the user plane function should transmit a packet to a hop node. According to other example embodiments, the parameters may further include identifiers used for aggregated streams. According to further example embodiments, during the protocol data unit session modification procedure, the first network element, and the user plane function may be configured with parameters derived from mapping of the talker and listener configurations. In certain example embodiments, the method may also include providing the first stream requirements, and an identifier of the talker and listener to the backhaul network. In other example embodiments, the method may further include aggregating packets of multiple streams in an overlay network to one or more streams in the backhaul network.

Figure 7:
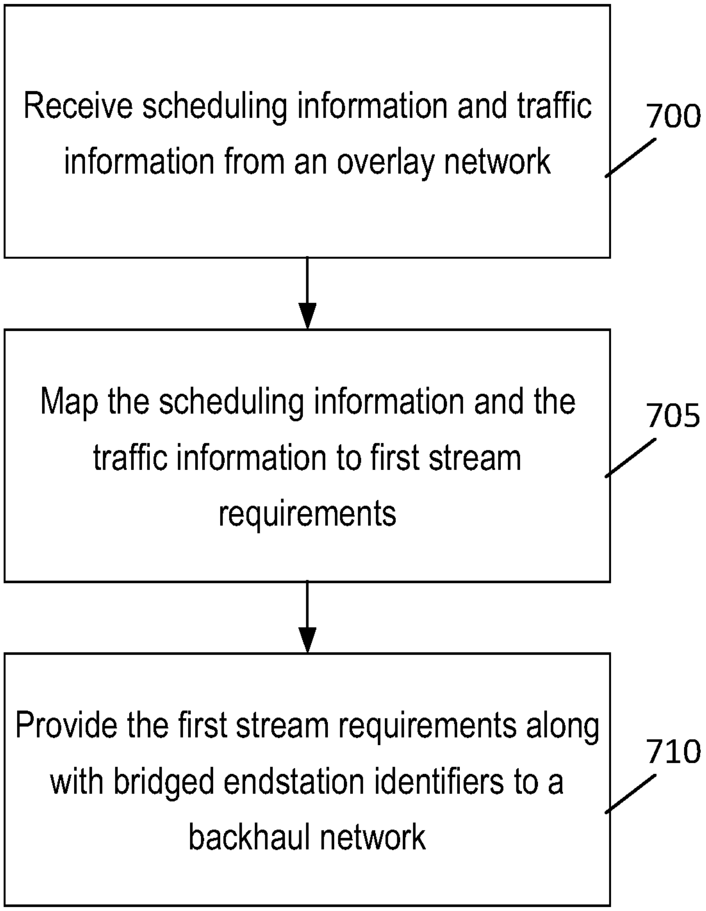
FIG. 7 illustrates an example flow diagram of another method, according to certain example embodiments.

FIG. 7 illustrates an example of a flow diagram of another method, according to certain example embodiments. In an example embodiment, the method of FIG. 7 may be performed by a network entity, or a group of multiple network elements in a 3GPP system, such as LTE or 5G-NR. For instance, in an example embodiment, the method of FIG. 7 may be performed by a network function such as, for example, a TSN AF, TSCTSF or SMF, or other device similar to one of apparatuses 10 or 20 illustrated in FIG. 9.

According to certain example embodiments, the method of FIG. 7 may include, at 700, receiving scheduling information and traffic information from an overlay network. At 705, the method may also include mapping the scheduling information and the traffic information to first stream requirements. At 710, the method may further include providing the first stream requirements along with bridged endstation identifiers to a backhaul network.

According to certain example embodiments, the bridged endstation identifiers may be received as part of a protocol data unit session establishment procedure. According to some example embodiments, the method may further include forwarding schedules of the backhaul network to a bridged endstation, and appending aggregation information along with bridged endstation configuration information the forwarded schedules. According to other example embodiments, the method may include appending aggregation information to the first stream requirements. According to further example embodiments, the method may also include triggering a protocol data unit session modification procedure to establish appropriate quality of service flows.

In certain example embodiments, the protocol data unit session modification procedure may include the aggregation information. In some example embodiments, the method may further include aggregating packets of multiple streams in an overlay network to one or more streams in the backhaul network. In other example embodiments, the aggregation information may include stream identifiers of the aggregated stream to be used in the backhaul network. In further example embodiments, the method may include storing binding information between a user equipment session relevant for a stream and a radio access network that serves the user equipment.

According to certain example embodiments, the method may also include being preconfigured with binding information to which the bridge endstation, the network element, or the user plane function is part of. According to some example embodiments, the binding information may be retrieved from another network function on a need basis. According to other example embodiments, the method may further include deriving the bridge endstation identifiers in the overlay network based on the binding information.

Figure 8:
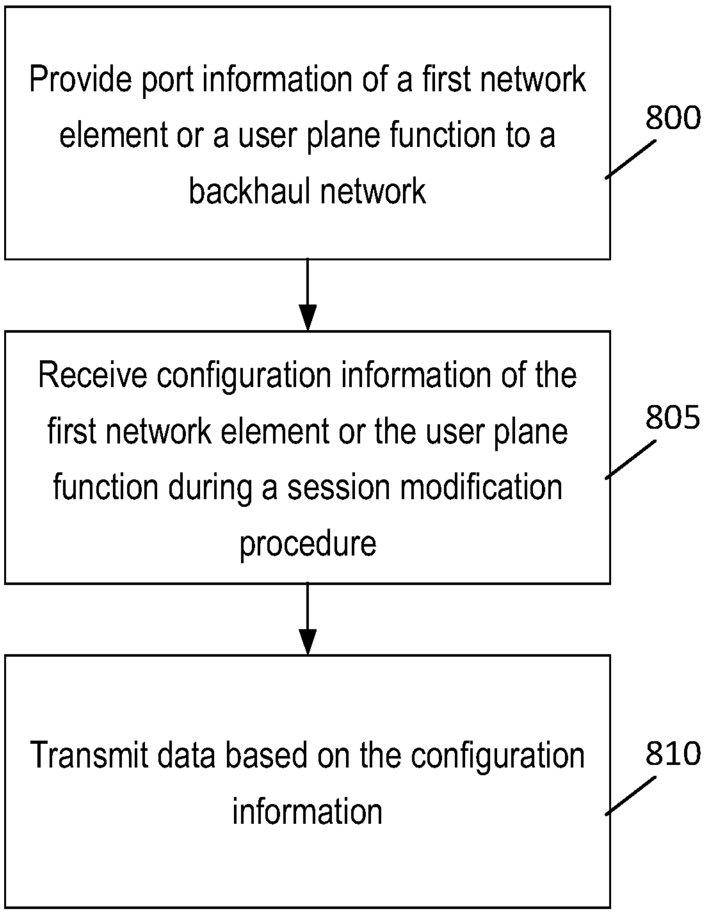
FIG. 8 illustrates an example flow diagram of a further method, according to certain example embodiments.

FIG. 8 illustrates an example of a flow diagram of a further method, according to certain example embodiments. In an example embodiment, the method of FIG. 9 may be performed by a network entity, or a group of multiple network elements in a 3GPP system, such as LTE or 5G-NR.

Figure 9:
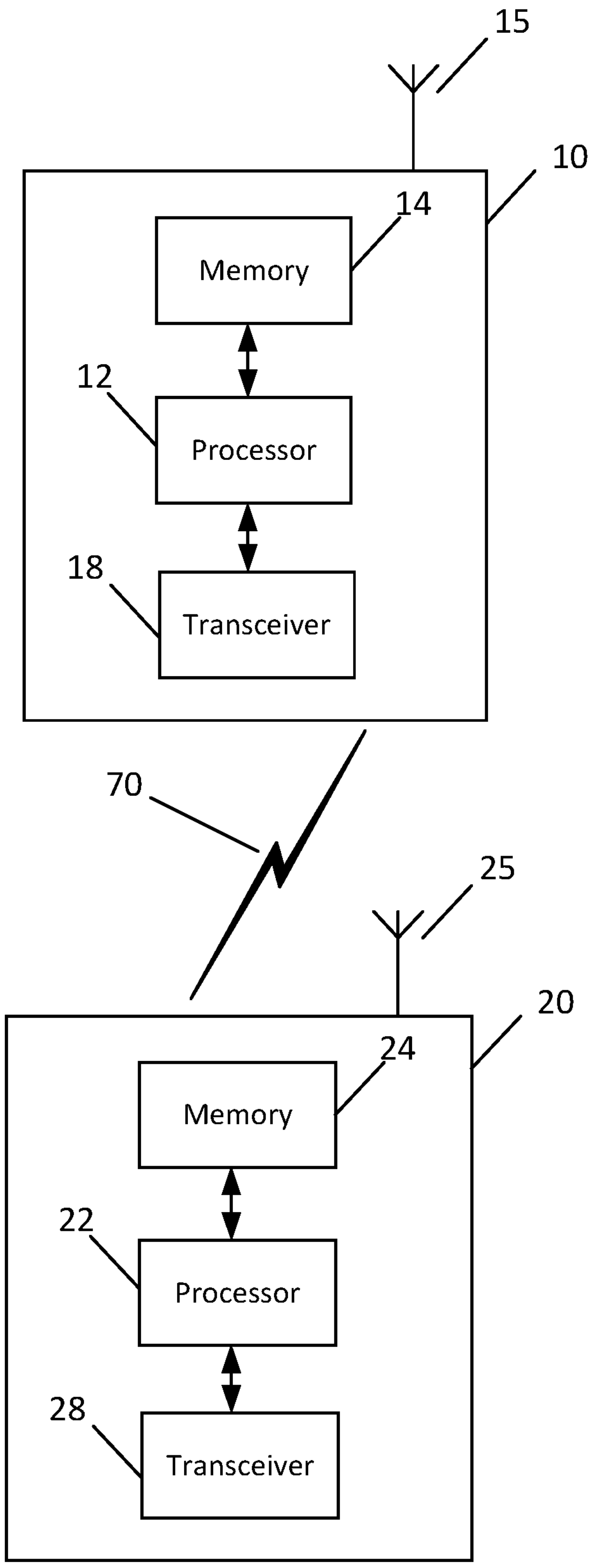
FIG. 9 illustrates a set of apparatuses, according to certain example embodiments.

For instance, in an example embodiment, the method of FIG. 8 may be performed by a UPF or gNB, or other device similar to one of apparatuses 10 or 20 illustrated in FIG. 9.

According to certain example embodiments, the method of FIG. 8 may include, at 800, providing port information of a first network element or a user plane function to a backhaul network. At 805, the method may also include receiving configuration information of the first network element or the user plane function during a session modification procedure. At 810, the method may further include transmitting data based on the configuration information. According to certain example embodiments, the method may further include providing associated bridged endstation identifiers to a second network element during a protocol data unit session establishment procedure. According to other example embodiments, the method may also include receiving aggregation information of the first network element or the user plane function during a session modification procedure.

FIG. 9 illustrates a set of apparatus 10 and 20 according to certain example embodiments. In certain example embodiments, the apparatus 10 may be a node or element in a communications network or associated with such a network, such as a UE, mobile equipment (ME), mobile station, mobile device, stationary device, IoT device, or other device. It should be noted that one of ordinary skill in the art would understand that apparatus 10 may include components or features not shown in FIG. 9.

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 9.

As illustrated in the example of FIG. 6, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 9, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-5.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-5.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

As illustrated in the example of FIG. 9, apparatus 20 may be a network, core network element, or element in a communications network or associated with such a network, such as gNB, UPF, TSN AF, TSCTSF, or SMF. It should be noted that one of ordinary skill in the art would understand that apparatus 20 may include components or features not shown in FIG. 9.

As illustrated in the example of FIG. 9, apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 9, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-8.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-8.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

For instance, in certain example embodiments, apparatus 20 may be controlled by memory 24 and processor 22 to configure a first network element and a user plane function to expose port information of a first network element and a user plane function to a backhaul network. Apparatus 20 may also be controlled by memory 24 and processor 22 to receive associated identifiers of the first network element and the user plane function from a second network element.

In addition, apparatus 20 may be controlled by memory 24 and processor 22 to determine second stream requirements in 5GS for the streams transmitted through 5GS. Apparatus 20 may further be controlled by memory 24 and processor 22 to derive first stream requirements for a stream to be transmitted between a talker and a listener based on the second stream requirements and talker and listener identifiers which are the associated identifiers of the first network element or the user plane function for the backhaul network. In addition, apparatus 20 may be controlled by memory 24 and processor 22 to receive configurations of the first network element and the user plane function to the first network element and the user plane function based on the first stream requirements. Further, apparatus 20 may be controlled by memory 24 and processor 22 to trigger a protocol data unit session modification procedure for the stream based on the second stream requirements and the configurations of the first network element and the user plane function.

Additionally, in certain example embodiments, apparatus 20 may be controlled by memory 24 and processor 22 to receive scheduling information and traffic information from an overlay network. Apparatus 20 may also be controlled by memory 24 and processor 22 to map the scheduling information and the traffic information to first stream requirements. Apparatus 20 may further be controlled by memory 24 and processor 22 to provide the first stream requirements along with bridged endstation identifiers to a backhaul network.

Further, in certain example embodiments, apparatus 20 may be controlled by memory 24 and processor 22 to provide port information of a first network element or a user plane function to a backhaul network. Apparatus 20 may also be controlled by memory 24 and processor 22 to receive configuration information of the first network element or the user plane function during a session modification procedure. Apparatus 20 may further be controlled by memory 24 and processor 22 to transmit data based on the configuration information.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for performing any of the methods described herein including, for example, means for configuring a first network element and a user plane function to expose port information of a first network element and a user plane function to a backhaul network. The apparatus may also include means for receiving associated identifiers of the first network element and the user plane function from a second network element. In addition, the apparatus may include means for determining second stream requirements in 5GS for the streams transmitted through 5GS. The apparatus may further include means for deriving first stream requirements for a stream to be transmitted between a talker and a listener based on the second stream requirements and talker and listener identifiers which are the associated identifiers of the first network element or the user plane function for the backhaul network. In addition, the apparatus may include means for receiving configurations of the first network element and the user plane function to the first network element and the user plane function based on the first stream requirements. Further, the apparatus may include means for triggering a protocol data unit session modification procedure for the stream based on the second stream requirements and the configurations of the first network element and the user plane function.

Certain example embodiments may further be directed to an apparatus that includes means for receiving scheduling information and traffic information from an overlay network. The apparatus may also include means for mapping the scheduling information and the traffic information to first stream requirements. The apparatus may further include means for providing the first stream requirements along with bridged endstation identifiers to a backhaul network.

Other example embodiments may be directed to an apparatus that includes means for providing port information of a first network element or a user plane function to a backhaul network. The apparatus may also include means for receiving configuration information of the first network element or the user plane function during a session modification procedure. The apparatus may further include means for transmitting data based on the configuration information.

Certain example embodiments described herein provide several technical improvements, enhancements, and/or advantages. In some example embodiments, it may be possible to provide interworking between the 5GS, the TSN backhaul network, and the overlay network, and achieve efficient E2E connection(s). According to other example embodiments, it may also be possible to reduce E2E delay, and enhance deterministic delivery of packets. Additionally, other example embodiments may provide the ability to map the stream requirements and scheduling information from the overlay network to the backhaul network.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the disclosure as discussed above may be practiced with procedures in a different order, and/or with hardware elements in configurations which are different than those which are disclosed. Therefore, although the disclosure has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary:

- 3GPP 3rd Generation Partnership Project
- 5G 5th Generation
- 5GCN 5G Core Network
- 5GS 5G System
- AF Application Function
- BAT Burst Arrival Time
- BS Base Station
- CN Core Network
- DL Downlink
- eNB Enhanced Node B
- E-UTRAN Evolved UTRAN
- gNB 5G or Next Generation NodeB
- LTE Long Term Evolution
- NR New Radio
- SMF Session Management Function
- TSC Time Sensitive Communication
- TSCAI Time Sensitive Communication Assistance Information
- TSCTSF Time Sensitive Communication Time Synchronization Function
- UE User Equipment
- UL Uplink

I claim:

1. An apparatus, comprising:

at least one processor; and at least one memory comprising computer program code, the at least one memory and the computer program code are configured, with the at least one processor to cause the apparatus at least to:

operate as a time sensitive networking application function (TSN AF) in a fifth generation system (5GS) that interworks with an overlay TSN network and a TSN backhaul network between a gNB and a user plane function (UPF), wherein the gNB and the UPF are TSN-aware end stations;

configure the gNB and the UPF to expose port information for respective ports toward an N3 interface to a centralized network configurator of the TSN backhaul network using link-layer discovery protocol (LLDP), the port information comprising a gNB identifier, a UPF identifier, a port number, and a TSN capability of the respective port;

receive associated identifiers of the gNB and the UPF from a session management function (SMF), the associated identifiers comprising the gNB identifier and the UPF identifier associated with a protocol data unit (PDU) session of a user equipment (UE);

receive, from a centralized network configurator of the overlay TSN network, scheduling information comprising at least one of a Qbv schedule or per-stream filtering and policing (PSFP) information for a plurality of overlay TSN streams transmitted through the 5GS;

determine second stream requirements in the 5GS for the plurality of overlay TSN streams transmitted through the 5GS;

derive first stream requirements for at least one aggregated backhaul stream to be transmitted between a talker and a listener based on the second stream requirements and talker and listener identifiers, wherein, for uplink traffic, the talker identifier is the gNB identifier and the listener identifier is the UPF identifier, and wherein, for downlink traffic, the talker identifier is the UPF identifier and the listener identifier is the gNB identifier;

provide the first stream requirements and the talker and listener identifiers to the centralized network configurator of the TSN backhaul network;

receive configurations of the gNB and the UPF from the centralized network configurator of the TSN backhaul network, based on the first stream requirements, the configurations comprising a TimeAwareOffset defining when the gNB or the UPF is to transmit packets of the at least one aggregated backhaul stream to a next-hop node in the TSN backhaul network; and trigger a protocol data unit session modification procedure for the stream based on the second stream requirements and the configurations of the gNB and the UPF, wherein the protocol data unit session modification procedure provides, to the gNB and the UPF, packet detection rules or forwarding action rules that map the plurality of overlay TSN streams to the at least one aggregated backhaul stream and provide the TimeAwareOffset.

2. The apparatus according to claim 1, wherein the associated identifiers received from the SMF further comprise a UE medium access control identifier associated with the PDU session, and wherein the apparatus stores binding information associating the UE medium access control identifier, the PDU session, the gNB identifier, and the UPF identifier.

3. The apparatus according to claim 2, wherein deriving the first stream requirements comprises using the binding information to determine that, for uplink traffic, the gNB is the talker and the UPF is the listener, and that, for downlink traffic, the UPF is the talker and the gNB is the listener.

4. The apparatus according to claim 3, wherein deriving the first stream requirements comprises aggregating the plurality of overlay TSN streams into the at least one aggregated backhaul stream based on a priority class of each of the plurality of overlay TSN streams.

5. The apparatus according to claim 4, wherein receiving the scheduling information from the centralized network configurator of the overlay TSN network comprises receiving both a Qbv schedule and per-stream filtering and policing information for the plurality of overlay TSN streams.

6. The apparatus according to claim 5, wherein the configurations received from the centralized network configurator of the TSN backhaul network comprise talker and listener configurations, and wherein the apparatus maps the talker and listener configurations into gNB and UPF configurations.

7. The apparatus according to claim 6, wherein mapping the talker and listener configurations into the gNB and UPF configurations comprises copying parameters from the talker and listener configurations into at least one of a bridge management information container or a port management information container.

8. The apparatus according to claim 7, wherein the parameters copied into the at least one of the bridge management information container or the port management information container comprise the TimeAwareOffset, identifiers of the plurality of overlay TSN streams, identifiers of the at least one aggregated backhaul stream, and mapping information between the plurality of overlay TSN streams and the at least one aggregated backhaul stream.

9. The apparatus according to claim 8, wherein triggering the protocol data unit session modification procedure comprises sending, from the TSN AF to the SMF, the second stream requirements and the configurations of the gNB and the UPF for delivery to the gNB and the UPF during the protocol data unit session modification procedure.

10. The apparatus according to claim 9, wherein the packet detection rules identify packets using stream identifiers of the plurality of overlay TSN streams, and wherein the forwarding action rules associate the identified packets with stream identifiers of the at least one aggregated backhaul stream for scheduled transmission in the TSN backhaul network according to the TimeAwareOffset.

* * * * *